United States Patent
Aley et al.

(10) Patent No.: US 10,671,182 B2
(45) Date of Patent: Jun. 2, 2020

(54) TEXT PREDICTION INTEGRATION

(71) Applicant: TOUCHTYPE LIMITED, London (GB)

(72) Inventors: James Aley, London (GB); Douglas Orr, Brentwood (GB); Alex Nixon, London (GB)

(73) Assignee: TOUCHTYPE LIMITED, London (GB)

(*) Notice: Subject to any disclaimer, the term of this patent is extended or adjusted under 35 U.S.C. 154(b) by 0 days.

(21) Appl. No.: 15/519,113

(22) PCT Filed: Oct. 15, 2015

(86) PCT No.: PCT/GB2015/053067
§ 371 (c)(1),
(2) Date: Apr. 13, 2017

(87) PCT Pub. No.: WO2016/059418
PCT Pub. Date: Apr. 21, 2016

(65) Prior Publication Data
US 2017/0255278 A1    Sep. 7, 2017

(30) Foreign Application Priority Data

Oct. 16, 2014 (GB) .................................... 1418402.2
Nov. 6, 2014 (GB) .................................... 1419798.2

(51) Int. Cl.
*G06F 3/023* (2006.01)
*G06F 3/0488* (2013.01)
(Continued)

(52) U.S. Cl.
CPC .......... *G06F 3/0237* (2013.01); *G06F 3/0236* (2013.01); *G06F 3/0482* (2013.01);
(Continued)

(58) Field of Classification Search
CPC ....................................................... G06F 17/00
See application file for complete search history.

(56) References Cited

U.S. PATENT DOCUMENTS 8,701,032 B1 * 4/2014 Zhai .................... G06F 3/04886
715/773
9,052,748 B2 * 6/2015 Medlock ............... G06F 17/276
(Continued)

FOREIGN PATENT DOCUMENTS

CN     104081320 A    10/2014
WO    2010112841 A1    10/2010
(Continued)

OTHER PUBLICATIONS

"International Preliminary Search Report on Patentability Issued in PCT Application No. PCT/GB2015/053067", dated Jan. 27, 2017, 9 Pages.
(Continued)

*Primary Examiner* — Jonathan C Kim
(74) *Attorney, Agent, or Firm* — BakerHostetler

(57) ABSTRACT

The present invention provides systems and methods for integrating text prediction from a text prediction engine into a mechanism for searching/filtering/ordering a plurality of items. In one embodiment, the system comprises a text prediction engine configured to receive user text input relating to a sequence of two or more terms, generate a plurality of word predictions for a first term of the sequence of two or more terms and generate at least one word prediction for a second term of the sequence of two or more terms. The text prediction engine is configured to generate a distribution of candidate word predictions for the sequence of two or more terms using the plurality of word predictions for the first term and the at least one word prediction for the second term. The system further comprises a mechanism for filtering/searching/ordering a plurality of items. The mecha-
(Continued)

nism is configured to filter/search/order a plurality of items using the distribution of word predictions for the sequence of two or more terms.

20 Claims, 6 Drawing Sheets

(51) Int. Cl.
  *G06F 17/27*    (2006.01)
  *G06F 3/0482*   (2013.01)
  *G06F 40/274*   (2020.01)
(52) U.S. Cl.
  CPC ...... *G06F 3/04883* (2013.01); *G06F 3/04886* (2013.01); *G06F 40/274* (2020.01)

(56) References Cited

U.S. PATENT DOCUMENTS

| | | | | |
|---|---|---|---|---|
| 9,189,472 | B2* | 11/2015 | Medlock | G06F 3/04883 |
| 9,424,246 | B2* | 8/2016 | Spencer | G06F 17/276 |
| 9,424,357 | B1* | 8/2016 | Hotchkies | G06F 16/9535 |
| 9,563,348 | B2* | 2/2017 | Medlock | G06F 3/0237 |
| 9,639,266 | B2* | 5/2017 | Medlock | G06F 3/0237 |
| 2006/0106769 | A1* | 5/2006 | Gibbs | G06F 17/276 |
| 2006/0253793 | A1* | 11/2006 | Zhai | G06F 3/04883 |
| | | | | 715/773 |
| 2007/0050351 | A1* | 3/2007 | Kasperski | G06F 16/951 |
| 2007/0168469 | A1* | 7/2007 | Church | G06F 17/273 |
| | | | | 709/219 |
| 2009/0198691 | A1 | 8/2009 | Kraft et al. | |
| 2009/0287626 | A1* | 11/2009 | Paek | G06F 16/3322 |
| | | | | 706/46 |
| 2010/0145699 | A1* | 6/2010 | Tian | G10L 15/07 |
| | | | | 704/257 |
| 2011/0320470 | A1* | 12/2011 | Williams | G06F 16/951 |
| | | | | 707/767 |
| 2012/0047025 | A1* | 2/2012 | Strohman | G06Q 30/0275 |
| | | | | 705/14.71 |
| 2012/0185498 | A1* | 7/2012 | Loofbourrow | G06F 16/90324 |
| | | | | 707/767 |
| 2012/0259615 | A1* | 10/2012 | Morin | G06F 3/0237 |
| | | | | 704/9 |
| 2013/0046544 | A1* | 2/2013 | Kay | G06F 3/04883 |
| | | | | 704/275 |
| 2013/0246329 | A1* | 9/2013 | Pasquero | G06F 17/276 |
| | | | | 706/52 |
| 2014/0104177 | A1* | 4/2014 | Ouyang | G06F 3/04883 |
| | | | | 345/168 |
| 2014/0108992 | A1* | 4/2014 | Bi | G06F 17/276 |
| | | | | 715/773 |
| 2014/0173407 | A1* | 6/2014 | Kruglick | G06F 17/276 |
| | | | | 715/226 |
| 2014/0201671 | A1* | 7/2014 | Zhai | G06F 3/0237 |
| | | | | 715/773 |
| 2014/0359515 | A1* | 12/2014 | Medlock | G06F 3/0237 |
| | | | | 715/773 |
| 2014/0372122 | A1* | 12/2014 | Harsham | G10L 15/22 |
| | | | | 704/257 |
| 2015/0121285 | A1* | 4/2015 | Eleftheriou | G06F 3/04842 |
| | | | | 715/773 |
| 2015/0160856 | A1* | 6/2015 | Jang | G06F 3/04886 |
| | | | | 715/773 |
| 2015/0205833 | A1* | 7/2015 | Choc | G06F 3/0482 |
| | | | | 707/767 |
| 2015/0228279 | A1* | 8/2015 | Biadsy | G10L 15/26 |
| | | | | 704/235 |
| 2015/0300832 | A1* | 10/2015 | Moore | G06F 16/29 |
| | | | | 455/456.3 |
| 2016/0063093 | A1* | 3/2016 | Boucher | G06F 16/90324 |
| | | | | 707/748 |
| 2016/0063115 | A1* | 3/2016 | Ayan | G06Q 50/01 |
| | | | | 707/722 |

FOREIGN PATENT DOCUMENTS

| | | |
|---|---|---|
| WO | 2013110955 A1 | 8/2013 |
| WO | 2014111959 A2 | 7/2014 |

OTHER PUBLICATIONS

"International Search Report and Written Opinion Issued in PCT Application No. PCT/GB20151053067", dated Feb. 29, 2016, 16 Pages.

"Written Opinion Issued in PCT Application No. PCT/GB2015/053067", dated Sep. 30, 2016, 9 Pages.

"First Office Action and Search Report Issued in Chinese Patent Application No. 201580056058.0", dated Mar. 2, 2020, 22 Pages.

* cited by examiner

TEXT PREDICTION INTEGRATION

CROSS-REFERENCE TO RELATED APPLICATIONS

This is a national stage application in the United States based on International Application No. PCT/GB2015/053067, filed on Oct. 15, 2015, which claims priority to Great Britain Patent Application No. 1418402.2, filed on Oct. 16, 2014, and Great Britain Patent Application No. 1419798.2, filed on Nov. 6, 2014, the disclosures of which are incorporated herein by reference in their entireties.

FIELD OF THE INVENTION

The present invention relates generally to a system and method for integrating text predictions into applications of an electronic device.

BACKGROUND

Users often input text incorrectly, and this is commonly corrected using text prediction technology in a virtual keyboard or in the application. For example, when typing a message 'Hi, how are yoo?' into a messaging app, the text prediction technology will correct the phrase to 'Hi, how are you?'

To correct the text input, the user is required to explicitly select the correction, e.g. by selecting the required prediction candidate or via autocorrect completion mechanisms such as pressing the spacebar.

As well as predicting text corrections, current predictive technology can predict text completions, with or without correction, e.g. predicting a full word from a few characters entered by a user. Again, to enter the desired word from a number of predicted words, the user has to select the word they intended to input.

There are a number of known applications which take text input and filter, search or order items within the application on the basis of the input text. For example, a contacts application may output the most likely contacts from a contacts list for selection by a user given the input of a name or part of a name by a user into a text filed.

However, current applications do not take into account a plurality of predictions for a given input term, at most searching on the exact input or a corrected version of that input (and not the two together).

It is an object of the present invention to provide improvement to the integration of text predictions with applications on an electronic device.

SUMMARY OF THE INVENTION

In a first aspect of the invention, there is provided a system comprising a text prediction engine and a mechanism for searching, ordering or filtering a plurality of items. The text prediction engine is configured to receive user text input relating to a sequence of two or more terms, generate a plurality of word predictions for a first term of the sequence of two or more terms, generate at least one word prediction for a second term of the sequence of two or more terms, and generate a distribution of word predictions for the sequence of two or more terms using the plurality of word predictions for the first term and the at least one word prediction for the second term. The mechanism is configured to filter/search/order a plurality of items using the distribution of word predictions for the sequence of two or more terms.

In the present context, a 'term' is a plurality of characters intended to represent a word or a portion of a word. A 'word prediction' is intended to encompass at least a word prediction corresponding to the verbatim text of the term, word completion and word correction.

User text input comprises characters entered by a user and/or the information related to the user character input, for example user touch location on a touchscreen display for character entry or gesture information, etc.

The mechanism is preferably configured to generate a query string from the distribution of word predictions for the sequence of two or more words and filter/search/order a plurality of items using the query string.

The mechanism may be configured to output one or more of the plurality of items for user selection, based on the search/filter/order processing.

The distribution of word predictions may comprise a sequence of the word predictions for each term in the sequence two or more terms.

The text prediction engine may be configured to generate a plurality of word predictions for the second term.

In one embodiment, the distribution of word predictions may comprise a sequence comprising the plurality of word predictions for the first term and the plurality of word predictions for the second term. The mechanism may generate a single search query from the distribution of candidates. The mechanism may generate a search query by using the "OR" operator between each of the plurality of word predictions for the first term, the "AND" operator between the plurality of word predictions for the first term and the plurality of word predictions for the second term, and the "OR" operator between each of the plurality of word predictions for the second term. Each word prediction may comprise a word mapped to a probability value, and wherein the mechanism may be configured to output a subset of the most-likely items, wherein the mechanism is configured to base the probability of an item on the sequence probability associated with the query which results in that item.

In another embodiment, the distribution of word predictions may comprise a plurality of sequences of two or more word predictions, the plurality of sequences of two or more word predictions corresponding to a plurality of sequence predictions. Each word prediction may comprises a word mapped to a probability value, and the text prediction engine may be configured to generate a sequence probability for each of the plurality of sequences of two or more word predictions, by combining the probabilities of the word predictions in each of the sequences. The text prediction engine may be configured to determine the n most-likely sequences of two or more word predictions using the sequence probabilities. The mechanism may generate a plurality of search queries from the plurality of sequences of two or more word predictions. The mechanism may be configured to generate n search queries from the n most-likely sequences. The mechanism may be configured to output a subset of the most-likely items, wherein the probability of an item is based on the sequence probability associated with the query which results in that item.

The first term and the second term may be separated by one or more terms or are adjacent terms in the sequence of two or more terms.

The plurality of items may comprise a plurality of contacts, messages, conversations, songs, phrases, commands or documents.

The system may further comprise a keyboard comprising the text prediction engine and an application comprising the search mechanism. The application may further comprises the plurality of items.

In a second aspect of the invention, there is provided a system comprising a text prediction engine configured to: receive user text input, and generate a plurality of text predictions based on the user text input; and a mechanism for ordering, filtering or searching a plurality of items using the plurality of text predictions, wherein the plurality of items comprises a plurality of contacts, messages, conversations, songs, phrases, commands or documents.

The system may further comprise a keyboard comprising the text prediction engine; and an application comprising the mechanism for filtering/searching/ordering.

The system may further comprising a language model trained on data relating to the items that are being filtered/searched/ordered or a dictionary comprising data relating to the items that are being filtered/searched/ordered, wherein the text prediction engine uses the language model/dictionary for generating the plurality of text predictions. The application may comprise the language model and the application is configured to pass the language model or dictionary to the text prediction engine.

The mechanism may be configured to output the n most likely items to a user interface for display and user selection.

The system may comprise a plurality of mechanisms, and wherein the keyboard is configured to interface with each of those mechanisms.

The user text input may comprise a sequence of two or more terms, and wherein the text prediction engine configured to: generate a plurality of word predictions for a first term of the sequence of two or more terms and generate at least one word prediction for a second term of the sequence of two or more terms; and generate a distribution of candidate word predictions for the sequence of two or more terms using the plurality of word predictions for the first term and the at least one word prediction for the second term; and the mechanism for filtering/searching/ordering a plurality of items is configured to filter/search/order the plurality of items using the distribution of word predictions for the sequence of two or more terms.

The mechanism is configured to generate a query string from the distribution of word predictions for the sequence of two or more words; and filter/search/order a plurality of items using the query string.

The distribution of word predictions comprises a sequence of the word predictions for each term in the sequence two or more terms. The text prediction engine may be configured to generate a plurality of word predictions for the second term, and the distribution of word predictions comprises a sequence comprises the plurality of word predictions for the first term and the plurality of word predictions for the second term.

The mechanism may generate a single search query from the distribution of candidates. The mechanism may generate a search query by using the "OR" operator between each of the plurality of word predictions for the first term, the "AND" operator between the plurality of word predictions for the first term and the plurality of word predictions for the second term, and the "OR" operator between each of the plurality of word predictions for the second term.

The first term and the second term may be separated by one or more terms or are adjacent terms in the sequence of two or more terms.

Each word prediction may comprise a word mapped to a probability value, and wherein the mechanism is configured to output a subset of the most-likely items, wherein the mechanism is configured to base the probability of an item on the sequence probability associated with the query which results in that item. The distribution of word predictions may comprise a plurality of sequences of two or more word predictions, the plurality of sequences of two or more word predictions corresponding to a plurality of sequence predictions.

Each word prediction may comprise a word mapped to a probability value, and the text prediction engine is configured to generate a sequence probability for each of the plurality of sequences of two or more word predictions, by combining the probabilities of the word predictions in each of the sequences.

The text prediction engine may be configured to determine the n most-likely sequences of two or more word predictions using the sequence probabilities.

The mechanism may generate a plurality of search queries from the plurality of sequences of two or more word predictions. The mechanism may be configured to generate n search queries from the n most-likely sequences The mechanism may be configured to output a subset of the most-likely items, wherein the probability of an item is based on the sequence probability associated with the query which results in that item.

The system of either aspect may further comprise a user interface comprising: a keyboard comprising a character entry display; and an input text field for displaying inputted text; and a predicted items pane for displaying items predicted by the mechanism.

The user interface may further comprises a text prediction pane which displays text predictions for user selection, and wherein the user interface is configured to hide the text prediction pane when the application is functioning to generate and display contacts, messages, conversations or documents for user review and selection.

The keyboard may be touch sensitive and the user is able to input characters via a gesture across the user interface, wherein the gesture is a continuous touch gesture and the predicted items pane displays one or more items based on the continuous gesture, even when there is no text committed to the text input field.

In a third aspect there is provided a user interface comprising: a keyboard comprising a character entry display; and an input text field for displaying inputted text; and a predicted items pane for displaying predicted messages contacts, conversations or documents the user may wish to interact with, based on text input by a user; wherein the user interface further comprises a text prediction pane which displays text predictions for user selection, and wherein the user interface is configured to hide the text prediction pane when the user interface is functioning to generate and display the predicted items for user review and selection.

In a fourth aspect there is provided a user interface comprising: a keyboard comprising a character entry display; an input text field for displaying inputted text; and a predicted items pane for displaying predicted messages contacts, conversations or documents the user may wish to interact with, based on text input by a user; wherein the keyboard is touch sensitive and the user is able to input characters via a gesture across the user interface, wherein the gesture is a continuous touch gesture and the predicted items pane displays one or more items based on the continuous gesture, even when there is no text committed to the text input field.

In a fifth aspect there is provided a method for filtering/ordering/searching a plurality of items, the method comprising: receiving user text input relating to a sequence of two or more terms; generating a plurality of word predictions for a first term of the sequence of two or more terms; generating at least one word prediction for a second term of the sequence of two or more terms; and generating a distribution of word predictions for the sequence of two or more terms using the plurality of word predictions for the first term and the at least one word prediction for the second term; filtering/ordering/searching a plurality of items using the distribution of word predictions for the sequence of two or more terms.

The step of filtering/ordering/searching a plurality of items using the distribution of word predictions for the sequence of two or more terms may comprise generating a query string from the distribution of candidate word predictions for the sequence of two or more words; and filtering/searching/ordering the a plurality of items using the query string.

The distribution of word predictions may comprise a sequence of the word predictions for each term in the sequence two or more terms. The text prediction engine may be configured to generate a plurality of word predictions for the second term, and the distribution of word predictions comprises a sequence comprises the plurality of word predictions for the first term and the plurality of word predictions for the second term. The mechanism may generate a single search query from the distribution of candidates. The mechanism may generate a search query by using the "OR" operator between each of the plurality of word predictions for the first term, the "AND" operator between the plurality of word predictions for the first term and the plurality of word predictions for the second term, and the "OR" operator between each of the plurality of word predictions for the second term.

The first term and the second term may be separated by one or more terms or may be adjacent terms in the sequences of two or more terms.

Each word prediction may comprise a word mapped to a probability value, and wherein the method comprises outputting a subset of the most-likely items, wherein the probability of an item is based on the sequence probability associated with the query which results in that item.

The distribution of word predictions may comprise a plurality of sequences of two or more word predictions, the plurality of sequences of two or more words corresponding to a plurality of sequence predictions. Each word prediction may comprise a word mapped to a probability value, and the method comprises generating a sequence probability for each of the plurality of sequences of two or more word predictions, by combining the probabilities of the word predictions in each of the sequences. The method may comprise generating a plurality of search queries from the plurality of sequences of two or more word predictions. The method may comprises outputting a subset of the most-likely items, wherein the probability of an item is based on the sequence probability associated with the query which results in that item.

In a sixth aspect there is provided a method comprising: receiving user text input; generating a plurality of text predictions based on the user text input; and ordering, filtering or searching a plurality of items using the plurality of text predictions, wherein the plurality of items comprises a plurality of contacts, messages, conversations, songs, phrases, commands or documents.

The method may further comprise outputting the n most likely items.

The user text input may comprise a sequence of two or more terms, and wherein the method comprises: generating a plurality of text predictions based on the user text input comprises: generating a plurality of word predictions for a first term of the sequence of two or more terms; generating at least one word prediction for a second term of the sequence of two or more terms; and generating a distribution of candidate word predictions for the sequence of two or more terms using the plurality of word predictions for the first term and the at least one word prediction for the second term; and ordering, filtering or searching a plurality of items using the plurality of text predictions comprises ordering, filtering, or searching the plurality of items using the distribution of word predictions for the sequence of two or more terms.

Ordering, filtering, or searching the plurality of items using the distribution of word predictions for the sequence of two or more terms may comprise generating a query string from the distribution of word predictions for the sequence of two or more words; and filtering/searching/ordering a plurality of items using the query string.

In a seventh aspect of the invention, there is provided a computer program for causing a processor to carry out any of the above described methods.

DETAILED DESCRIPTION OF THE EMBODIMENTS OF THE INVENTION

The system according to the present invention comprises a text prediction engine configured to generate a plurality of text predictions from user text input and a mechanism for searching/filtering/searching a plurality of items using the plurality of text predictions.

Figure 1:
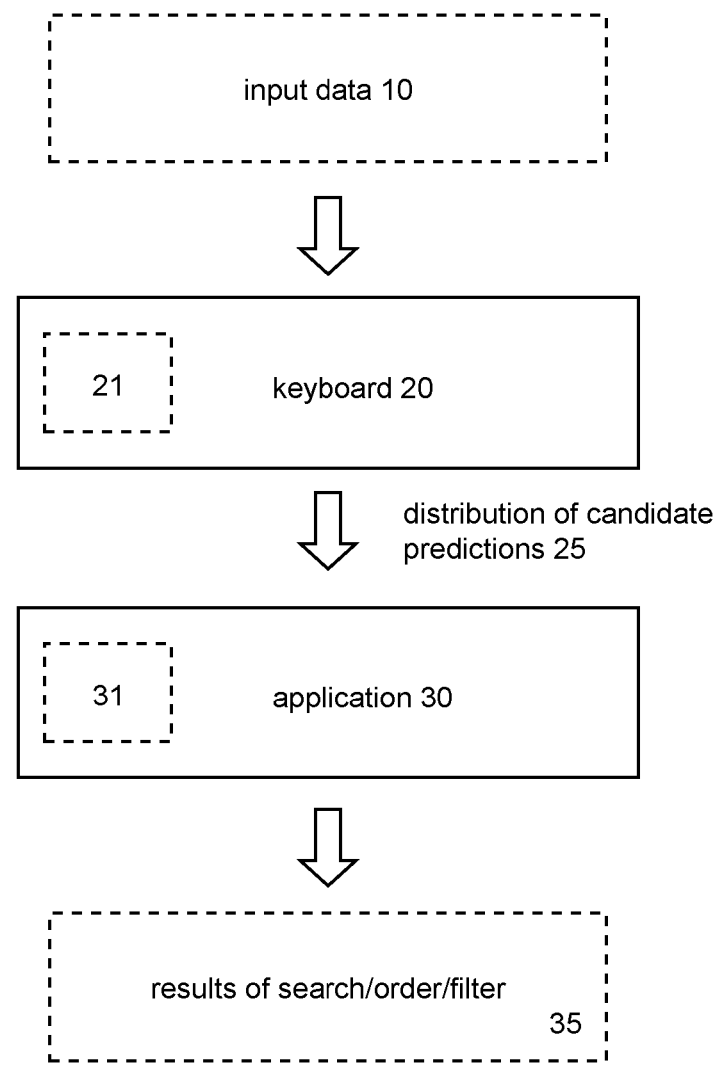
FIG. 1 is a schematic of a system in accordance with the present invention.

Referring to FIG. 1, a preferred embodiment of the system of the present invention comprises a keyboard 20 and an application 30, with an interface between them. The keyboard 20 comprises the text prediction engine 21 and the application 30 comprises the mechanism 31 to search/filter/order a plurality of items.

The keyboard 20 generates (via the text prediction engine 21) a plurality of word predictions 25 (including corrections and completions) based on user inputted text 10 that are passed to an application 30 for processing (e.g. searching, filtering ordering) items (e.g. messages, contacts, documents) within the application 30 (using the mechanism 31).

In particular, the text prediction engine 21 preferably generates predictions for the whole input field 100, i.e. it generates a probability distribution to represent what the user intended to input via the whole field input. To do this, the text prediction engine 21 generates predictions (including corrections) for one or more, or preferably each, word of the input field, to build up a distribution of prediction candidates 25 for the whole field input that is sent to the application 30 for filtering, ordering, or searching items within the application. Alternatively, the text prediction engine 21 may be configured to generate a distribution of prediction candidates 25 for a portion of the whole field input or a subset of the terms of the whole input field. For example, the text prediction engine 21 may ignore common terms, such as 'the' and 'a', etc. which are less useful in identifying specific context, content, etc., or the prediction engine may be configured to generate a plurality of word predictions for any term in which it has low confidence, for example, if the word is spelt fully and correctly, the text prediction engine may generate a single word prediction corresponding to the verbatim text of the term. However, if a term of the input sequence comprises a prefix of a word only or a word is spelt badly, the prediction engine may generate a plurality of word predictions corresponding to that term to take into account the lower confidence.

To generate the distribution of prediction candidates 25 for the input field, the keyboard 20 preferably stores the input 10 corresponding to everything the user has input into the input field. The text prediction engine 21 (or a separate input modelling component, not shown) may generate a KeyPressVector using the input data 10 or input character sequence, as described in detail in international patent application no. PCT/GB2010/000622, filed on 30 Mar. 2010, and published on 7 Oct. 2010, which is hereby incorporated by reference in its entirety.

The text prediction engine 21 may be configured to generate word predictions using an n-gram language model and the KeyPressVector, as described in detail in international patent application no. PCT/GB2010/000622, filed on 30 Mar. 2010, and published on 7 Oct. 2010, which is hereby incorporated by reference in its entirety. The text prediction engine 21 determines which character sequences are valid given the terms stored in the language model or plurality of language models. Alternatively, the prediction engine 21 may use a simple dictionary of words to generate one or more text predictions for each of the terms in the user text input.

In a preferred embodiment, the prediction engine 21 of the keyboard 20 generates candidate predictions with a forward-pass n-gram scan. To generate prediction candidates for each term of the whole field, given n-gram word prediction technology (for example, as described in international patent application no. PCT/GB2010/000622, filed on 30 Mar. 2010), the prediction engine 21 is configured to start at the beginning of the text and work left-to-right, applying a process which takes into account context as well as input information. If desired, the top n word predictions for a given term can be used to generate the word predictions for the subsequent term, and/or the number of word predictions of context that is used can be greater than one. In particular, the prediction engine 21 provides contextual prediction of a term of the sequence of terms of the input field, by scanning through the input field, requesting predictions for each term, and using the top prediction for a term as context to generate predictions for the next term. The text prediction engine 21 takes as input the original input sequence 10, not subject to any automatic correction that may already have been provided by the keyboard. The word predictions for a term may comprise the verbatim text of the term, for example where the user has inputted all of the characters of the word without error, resulting in the verbatim text being the most likely word prediction, or where the text prediction engine 21 is configured to retain verbatim text as a word prediction, regardless of whether it is a valid word of the language model of the text prediction engine 21. The word predictions for a particular term may also comprise word completions and word corrections. In addition, the text prediction engine 21 may be configured to generate word predictions for the next term in a sequence of terms, where there has been no input by the user relating to that term, for example, using one or more of the previous terms or word predictions in the sequence as context for generating the next term in the sequence, and/or taking other context information into account.

The prediction engine 21 is part of the keyboard 20 in the embodiment of FIG. 1. When part of the Keyboard 20, the prediction engine 21 may incorporate the input modelling aspects. However, in other embodiments, for example that illustrated in FIG. 2b, the prediction engine 21 is separate from the keyboard 20, and the keyboard 20 transmits user input data, for example in the form of a KeyPressVector, to the prediction engine 21. Thus, the input modelling and the text prediction capabilities may be split across devices, for example the keyboard comprising an input modelling component, and the text prediction engine being stored elsewhere (e.g. on a server, as illustrated in FIG. 2b).

Preferably, the Keyboard 20 stores input information relating to more than just the characters determined to have been input by a user, for example sampling and storing information such as the touch locations on a touchscreen, which can be used for input modelling to determine the characters the user may have intended to input via their interaction with the keyboard, and thus to generate text predictions based on the modelled input, as described above with respect to the KeyPressVector, but also as described in detail in PCT/GB2012/052981, filed on 30 Nov. 2012, and published on 25 Jul. 2013, and as described in detail in PCT/GB2012/051006, both of which are hereby incorporated by reference in their entirety. By storing the information relating to the user's input (e.g. touch location, gesture information, etc.), the text prediction engine 21 is able to generate multiple text predictions based on the original user input data' (where the user input data may correspond to the actual characters selected by the user or the modelled character sequence based on keypress information (e.g. the KeyPressVector)), rather than any (potentially incorrect) word prediction that may have been selected automatically or by the user.

The text prediction engine 21 builds up a distribution of prediction candidates 25 for the whole field input to send to the application 30 by taking the text predictions generated by the prediction engine 21 for each term in the input sequence to generate the possible combinations of text predictions for the whole input field.

Preferably, the distribution of predictions candidates 25 comprises probabilities associated with the text predictions for the terms of input, taken from the language model or derived from frequency counts stored in the dictionary. By providing the distribution of prediction candidates 25 with probabilities it is possible to provide a probability for a particular whole filed candidate prediction, by combining the probabilities of the constituent terms in that whole field candidate prediction. The whole field candidate prediction probabilities can be used to rank the whole field candidate predictions or rank the items that are filtered/searched/ordered by those candidates, as will be described below.

The application 30 receives this distribution of prediction candidates 25 and uses these to filter/search/order objects/items (using a mechanism 31 for filtering/searching/ordering) within the application 30 that may be presented to the user, and selected either automatically or manually by the user.

There is improved prediction integration, because the word predictions that are generated on the basis of user input (user selected character sequence or modelled user input) are used by the application for processing items within that application 30. Furthermore, the processing of the items using the distribution of prediction candidates 25 takes place without explicit user selection of any text prediction or correction for a particular term in the input field. This obviates user interaction with a text prediction screen of a user interface, providing access to the most likely user-intended items 35 without the user having to correct their inputted text.

Owing to the prediction integration, the application is able to carry out processing using a query string with more information than previously used (comprising a plurality of text predictions and their associated probabilities), which provides for a more informative processing of items, as will be discussed in more detail in the application-specific examples below.

Figure 1A:
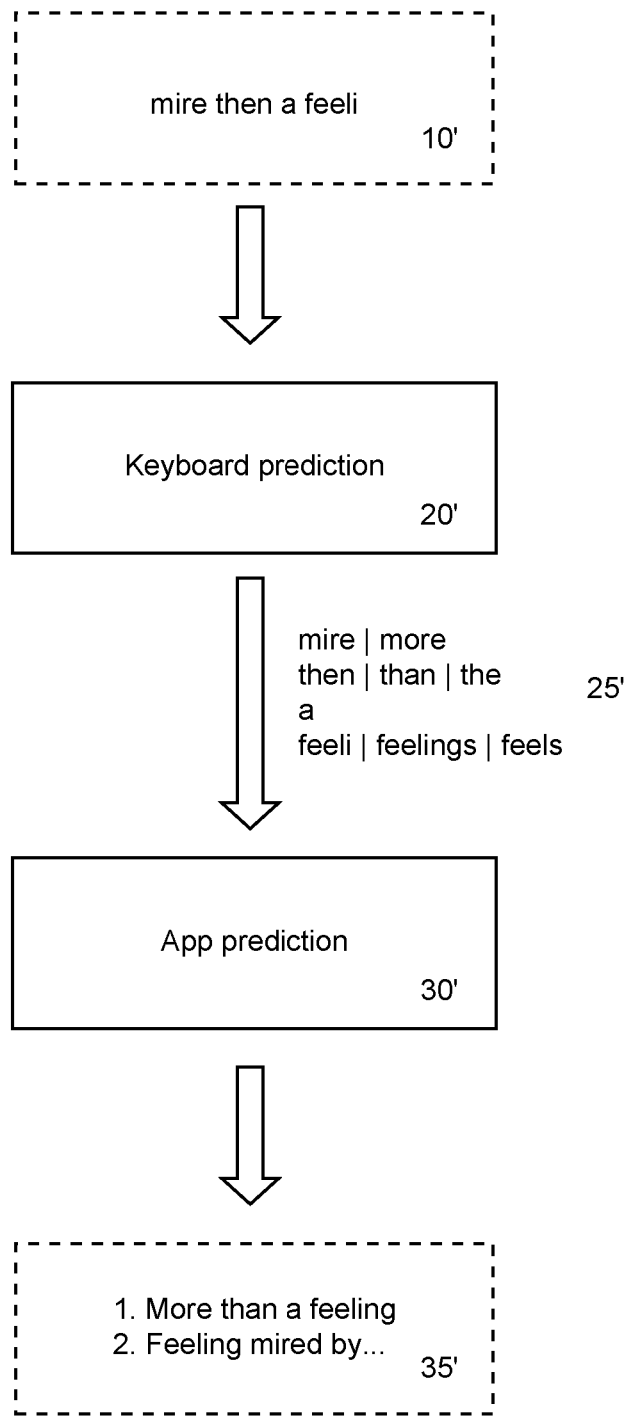
FIG. 1*a* is a schematic of the system of FIG. 1 in use, showing example data transmission within the system.

FIG. 1a illustrates the system of FIG. 1 in use to demonstrate input processing by the prediction engine 21' to generate a distribution of candidates 25' and item processing (in this case phrase matching) by the mechanism 31' using the distribution of prediction candidates 25'. The processes described are equally applicable to the searching/ordering/filtering of many different types of items, as described in more detail later.

In the example provided, the keyboard 20' (via a text prediction engine 21', not shown) generates prediction candidates (word predictions) for each of the terms in the user input 10', "mire then a feeli", generating one or more candidate predictions for each term, each candidate prediction having an associated probability, which for example may be as follows: "mire"→mire~0.5, more~0.5, "then-"→then~0.4, than~0.4, the~0.2; "a"→a~1; "feeli-"→feeli~0.1, feeling~0.5, feels~0.4.

The text prediction engine 21' then uses the candidate predictions to generate the distribution of prediction candidates 25' for the whole field input.

The distribution of prediction candidates 25' for the whole field is then passed to the application 30' (or retrieved from the keyboard 20' or text prediction engine 21' by the application 30'). The mechanism 31' of the application 30' then predicts the phrase that the user may have intended to enter by word matching between the distribution of candidates 25' for the whole field and known phrases stored within the application to generate the most probable phrases 35': "more than a feeling" and "feeling mired by".

The distribution of candidates 25' that is passed to the application 30' may take many forms. In one example, the distribution of candidates may comprise a plurality of sequences of combined candidate predictions for the whole input field, e.g. each sequence of combined candidate predictions comprises a possible prediction for the whole input field, with an associated cumulative probability:
"mire then a feeli"~0.02
"more then a feeli"~0.02
"mire than a feeli"~0.02
"more than a feeli"~0.02
"mire the a feeli"~0.01
"more the a feeli"~0.01
"mire then a feeling"~0.1
"more then a feeling"~0.1
"mire than a feeling"~0.1
"more than a feeling"~0.1
"mire the a feeling"~0.05
"more the a feeling"~0.05
"mire then a feels"~0.08
"more then a feels"~0.08
"mire than a feels"~0.08
"more than a feels"~0.08
"mire the a feels"~0.04
"more the a feels"~0.04

Thus, the keyboard 20' would pass 18 sequences of combined candidate predictions 25', each of four words, with an associated probability.

In a preferred embodiment of this example, the keyboard 20' may be configured to send the top n (non-factored) sequences of combined candidate predictions, based on their associated probabilities. By sending the top n candidates only, the system reduces the data transmission, whilst also reducing the computation carried out by the mechanism of the application which searches/orders/filters on the basis of the n combined candidate predictions.

In the present example, if the Keyboard 20' is configured to transmit, for example, the top 4 (n=4) candidates, it will transmit the following: "mire then a feeling" ~0.1; "more then a feeling" ~0.1; "mire than a feeling" ~0.1; "more than a feeling" ~0.1.

An alternative form of the distribution of candidate predictions 25' for the whole field is now described. Instead of combining the candidate predictions for the terms of the input field to generate the possible sequences of combined candidate predictions for the whole field with associated probabilities, the keyboard can, preferably, be configured to send a factorized distribution, which is more limited, but reduces the data transmission size considerably, as well as reducing the computation by the keyboard and the application. The distribution of candidates can be factored into independent words (unigram factorisation), which for the above example of "mire then a feeling" would comprise— two predictions for the first word (mire OR more), three predictions for the second word (then OR than OR the), one prediction for the third word (a) and three predictions for the fourth word (feeli OR feeling OR feels), as shown below:
mire~0.5 more~0.5
then~0.4 than~0.4 the~0.2
a~1
feeli~0.1 feeling~0.5 feels~0.4

Thus the unigram factored distribution comprises nine words with corresponding probabilities. Thus halving the data transmitted between the Keyboard and the application.

The limitation of doing this may be that the mechanism 31' (not shown in FIG. 1a) for filtering/ordering/searching has to assume that word candidates are independent, so contextual relationships between words cannot be represented. Whether or not contextual relationships will be lost, may dependent on the way in which the mechanism generates a query on the basis of the received factorized distribution. The loss of contextual relationships might not be important, dependent on the items that are being searched, ordered or filtered. For example, if the application is a contact address book, it does not really matter whether the address book is searched on the basis of the first name and then the last name, or the last name and then the first name, since there is unlikely to be two entries where the first and last names are the same but in a different order. However, if the system of the invention is used for grammar correction (as described below), the order may matter, which may mean contextual relationships are best retained.

A less limited version of factorisation which retains some of the contextual relationships is to factor the distribution into n-grams, where n is greater than 1. For example, the distribution can be factorised into word pairs (bi-gram factorisation). Returning to the example input "mire then a feeli", the bi-gram factorization of the prediction candidates would result in the following factorised distribution being sent to the application:

(mire~0.5) (more~0.5)
(mire.then~0.4    mire.than~0.4    mire.the~0.2)
    (more.then~0.1 more.than~0.8 more.the~0.1)
(then.a~1) (than.a~1) (the.a~1)
(a.feeli~0.1 a.feeling~0.5 a.feels~0.4)

The factored distribution comprises 14 words/word pairs and 14 probability values. The data transmission is therefore less than when transmitting the sequences of combined prediction candidates (each of four word length), but greater than the unigram factored distribution.

The distribution of candidate predictions 25' (which may be in the form of a sequence of combined candidate predictions or a factored distribution of candidate predictions, as described above) is received by the application 30'. The application may use the distribution of prediction candidates to process items within the application or the application may first generate a query from the distribution of prediction candidates to process the items of the application.

For the unfactored distribution of prediction candidates, e.g. the plurality of sequences of combined candidate predictions for the whole field input, the application may be configured to search/filter/order items using each of the plurality of sequences of combined prediction candidates in turn. Since the system is generating a plurality of queries (e.g. "more AND than AND a AND feeling", "mire AND than AND a AND feeling", etc.), relating to the plurality of sequences of combined prediction candidates, the search processing can be quite slow. Thus, by sending the top n sequences of combined candidate predictions, the search process computation can be reduced.

If the application 30' receives a factored distribution of candidates, the application is preferably configured to build a query (for example a boolean query, or some other representation that allows efficient querying, such as a state machine) from the factored distribution of candidates. For example, if an independent terms factorization (i.e. unigram factorisation) is used, the input is a sequence of sequences of prediction candidates (word-probability pairs). Each sequence of prediction candidates (word-probability pairs) represents the alternative candidates for a single term of input, so may be built into a weighed boolean query using the probability and the OR (logical disjunction) operator. The sequence of such sequences represents the distinct terms of input, so may be built into a boolean query using the AND (logical conjunction) operator.

For example, using the diagram above, the (non-weighted) query that could be constructed might be:

("mire" OR "more") AND ("then" OR "than" OR "the") AND "a" AND ("feeli" OR "feeling" OR "feels")

The application may be configured to build the same search query as the unigram factored distribution for the bi-gram factored distribution.

Any suitable search query that can be used to query a search mechanism 31' can be used. The suitability of the query is dependent on the structure of the search mechanism 31' as well as the form of the distribution of candidate predictions 25'. An advantage of the factored distributions is that the search engine 31' can search on the basis of all of the prediction candidates using a single query, increasing the efficiency of the query processing.

To work efficiently with the query strings, the search mechanism 31' of the application is preferably configured to operate word or 'token'-level matching to filter/search/order items of the application 30' using the search queries. For the example of phrase matching discussed above, "more than a feeling" is matched exactly to a phrase of the system, and the three sequences "mire than a feeling", "mire then a feeling", and "mire the a feeling" each share "feeling" and "mire" with the phrase "feeling mired by . . . "

Although the use of the system for phrase matching has been discussed above, with reference to the system of FIG. 1a, it is clear that this is applicable to document or content retrieval, where in the above example "More than a feeling" is the title of a song by the band "Boston", and "Feeling mired by" features in the poem "A Guilty Conscience (Ann Onymous)". Thus, the same search query "mire than a feeli" could be used to retrieve the content "More than a feeling (Boston) [song]" and "A Guilty Conscience (Ann Onymous) [poem]".

For document retrieval, there are many different approaches to "scoring" document or content matches in the information retrieval space, and many of these are capable of including "additional evidence" in the form of probabilities associated with the distribution of candidates, for example combining the confidence the keyboard has in the input sequence (the combined probability for the combined prediction candidate sequence which has generated the hit) with the confidence the search engine (or application) has in the document. For the factored case if the hit is generated by the following query strand "More AND than AND a AND feeling", the probability will be P(more)*P(than)*P(a)*P(feeling)=0.5*0.4*1*0.5=0.1, which is the same probability as the unfactored string, as discussed above.

Each document or piece of content within the application may have fixed metadata associated with it, for example the title of the piece of content and an identifier. In additional, each piece of content may comprise additional features associated with it that are used for scoring, which may include, for example, a set of words associated with the piece of content (e.g. the piece of content is a song with the title and an identifier, and the words of the song associated with it).

The search engine 31' takes as input the query (generated from the distribution of candidate predictions) and generates a score that the query is relevant given each piece of content. For example, each piece of content has a vector associated with it (which has been generated from the set of words associated with the content) and the search engine determines the similarity score between this content vector and a query vector (generated using the words of the query).

The search engine 31' or application 30, 30' can be configured to generate a score of the relevance of a document or piece of content to the search query in any suitable way. This score may be combined with the probability associated with the particular searched combination of candidate predictions, or may be used alone, to rank the pieces of output from the search engine or app.

In the systems illustrated in FIGS. 1 and 1a, the keyboard and application can be stored on the same device (e.g. mobile phone, PDA, tablet, computer, etc.).

FIG. 2b illustrates an alternative embodiment of a system, in accordance with the present invention. FIG. 2b illustrates a distributed system, comprising a device 1000 and a server 2000. The device comprises a keyboard 1020 and an application 1030. However the server 2000 comprises the text prediction engine 2021 and the mechanism 2031. The keyboard 1020 stores input data 100, relating to user interaction with the keyboard 1020. The Keyboard 1020 preferably comprises an optional input modelling component 1022, which models the user's input 100 to determine the characters that the user may have intended to enter. The keyboard 1020 passes the user's selected character sequence or, more preferably (where the keyboard comprises a modelling component), the modelled user input (e.g. in the form of a KeyPressVector) to the text prediction engine 2021 of the server 2000. The text prediction engine 2021 generates a distribution of prediction candidates 2025 using the user input data (raw or modelled) as described above. The distribution of prediction candidates 2025 is used by the search mechanism 2031 of the server 2000 to generate a query string to search/order/filter a plurality of items. The search mechanism 2031 sends the results of that item processing (for example, a prediction of the n most relevant items 2035) to the application 1030 of the device 1000 for display and preferably for user selection. As shown in FIG. 2b, the electronic device 1000 does minimal processing, storing the user input data 100, optionally modelling the user input data 1022, and displaying for user selection of the processed items with the application 1030. The main processing, e.g. of the text for generating the distribution of candidate predictions 2025, and of the items for generating item prediction 2035, occurs on the server 2000. The advantage of such a system is that the server 2000 can user larger language models and carry out more complex n-gram scans and search queries, since the server 2000 may have a much larger processing power than the electronic device 1000, which just need to store (and preferably process) user input and display the processed items.

The search mechanism 2031 of FIG. 2b processes items to generate item predictions 2035 (e.g. a selection of items that have been generated to filtering, ordering, searching a plurality of items). The plurality of items to be processed may be stored in the application 1030 or on the server 2000. If stored on the server 2000, the search mechanism 2031 may transmit the predicted items 2035 as well as data to identify those items to the application 1030 for display. Alternatively, if the items are stored on the device 1000, as part of the application 1030, the search engine 2031 may be configured to process data relating to the items, associated with identifies for those items. Once the items have been processed, filtered, searched (using one or more query strings and the data relating to the items), the search engine 2031 may transmit the identifiers of the predicted items 1035 to the application 1030. The application 1030 then users the identifiers to display the predicted items 2035 or information relating to the predicted items.

Figure 2A:
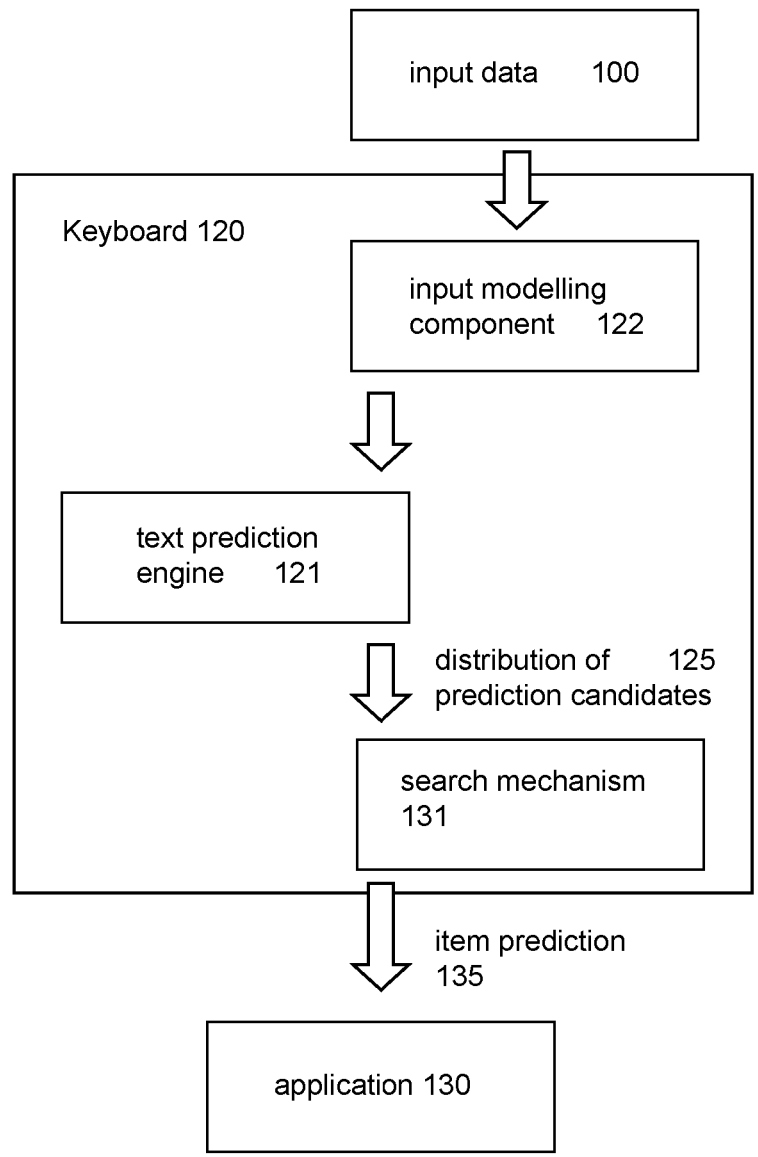
FIG. 2*a* is a schematic of a system in accordance with an embodiment of the invention.
Figure 2B:
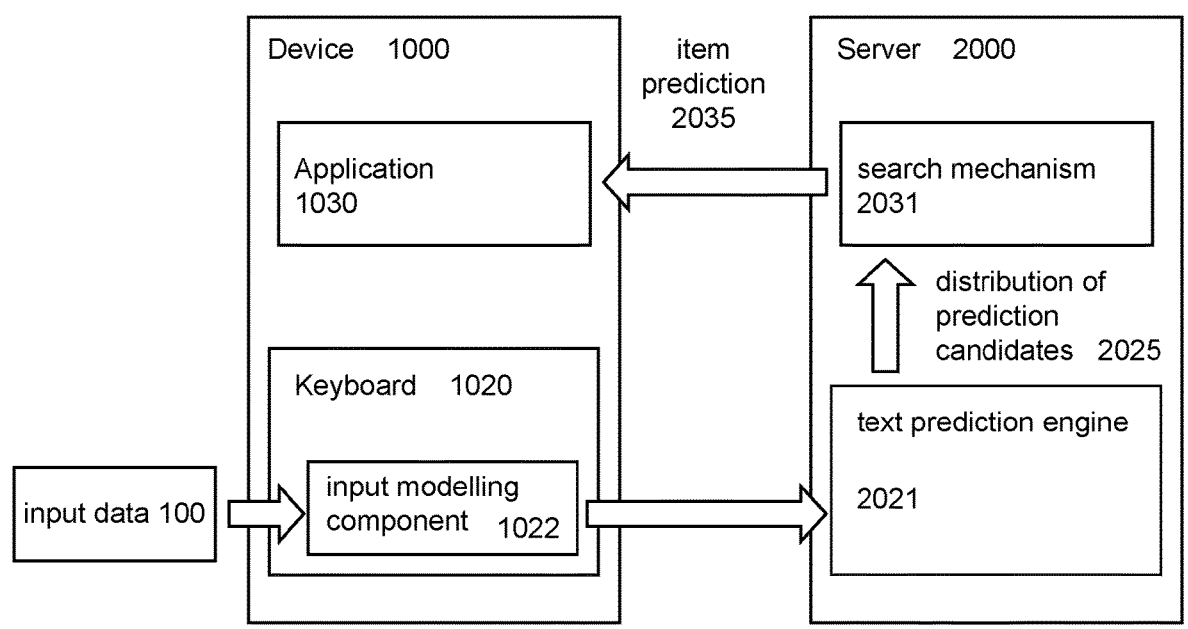
FIG. 2*b* is a schematic of a system in accordance with an embodiment of the invention.

With reference to FIG. 2a, in a variation of FIG. 1, the search engine 131 does not require direct access to the items to process them, and the search engine 131 can therefore be a part of the keyboard 120, rather than the application 130. The keyboard 120 receives user input 100, optionally models the input (using modelling component 122), generates text predictions and generates a distribution of candidate predictions 125 (using text prediction engine 121), and processes a plurality of items (using search mechanism 131). The keyboard 120 may then send the identifiers for the predicted/processed items 135 to the application 130, for display of items 135 or information (e.g. an image, a title, a summary, etc.) relating to those items.

As will be understood from the discussion of the different systems, the components of the system according to the present invention can be stored on a single device (e.g. as described with respect to FIGS. 1, 1a and 2a) or across a distributed system (as described with respect to FIG. 2b). There is also no requirement for the text prediction engine and the search mechanism to be on the same device. For example, in the system of FIG. 2b, the text prediction engine 2021 could be stored on the device 1000, rather than the server 2000.

Although the above systems have described with respect to a search mechanism 31, 31', 131, 2031 which is configured to generate a query string from a distribution of prediction candidates 25, 25', 125, 2025, the query string can alternatively be generated by the text prediction engine 21, 21', 121, 2021, with the query string being passed to the search mechanism for searching.

Sending a Set of Application-Specific or Search-Specific Words to the Prediction Engine In a number of applications, the requirement for whole-field correction is coupled with a custom vocabulary of terms. An example of this is contact search, where the vocabulary of possible terms to match is limited to the set of contact names, which is distinct from the usual user vocabulary.

To support this use case (where the whole-field correction is coupled with a custom vocabulary of terms), the application 30, 30', 130, 1030 or search mechanism 31, 31', 131, 1031 may send a domain vocabulary, a domain dictionary, a contextual model or a language model (for example an n-gram model) to the text prediction engine 21, 21', 121, 1021 to use when generating candidate predictions for each term of the input sequence. This may be done once, before input prediction commences, and the same model is retained for the lifetime of that input session. Alternatively, the text prediction engine 21, 21', 121, 1021 may retrieve this domain vocabulary/dictionary/context model/language model from an alternative source, or may be pre-configured with multiple vocabularies and determine which is appropriate at run-time based on context, e.g. application, field type, etc. By using a domain-specific dictionary, language model, etc., the text prediction engine 21, 21', 121, 1021 is able to generate more accurate text predictions for what the search mechanism 31, 31', 131, 1031 is searching for.

Alternatively, the same aim can be achieved by filtering the text predictions generated by the text prediction engine 21, 21', 121, 1021 with the application or search specific words. This filtering is preferably carried out at the text prediction engine 21, 21', 121, 1021, to reduce the data transmitted to the search mechanism 31, 31', 131, 1031 (since the distribution of prediction candidates will be generated from the filtered text predictions).

Contact Retrieval Application

In a preferred embodiment of the systems of the present invention, the systems are used to retrieve the most likely contacts a user wants to contact, e.g. via messaging or phoning that contact, based on user inputted text relating to that contact.

In one example, described with reference to FIG. 1, a user inputs "Adam Cu" into an input field, and a search engine 31 filters or orders a list of contacts on the basis of the text input 10 in order to output the most likely items 35 for user review and selection via an application 30. Although the example is described with reference to the system of FIG. 1, it will be understood that this use of the system is applicable to the other systems of the present invention.

In an example, the user wants to message Adam Cutmore in a messaging application 30, which comprises, amongst other contacts, the contacts Adam Cutmore, Dan Clements, and Adam Clements. As the characters are input by the user, the contact list is filtered by a mechanism 31 of the application 30 using the multiple predictions (which may also include verbatim input) generated by the prediction engine 21 of the keyboard 20. For this example, the top three contacts are "Adam Clements", "Dan Clements" and "Adam Cutmore" which are then displayed for user selection of the contact. The contact may be displayed with the name alone, or along with the most recent message(s) sent between the application's user and that contact. This use of the system allows for incorrect spelling and incomplete input of the contact's name, and removes the need for the user to manually correct their typing (e.g. using candidate predictions or autocorrect from the keyboard).

An example implementation of the above example is now described in more detail.

1.

The input field within an application 30 is given focus (e.g. user clicks on the application) and the keyboard 20 opens. The application 30 informs the keyboard 20 that it needs to enter a special mode, e.g. via a dedicated API such as Intent broadcasts on Android (the application 30 sends a message to the keyboard 20 telling it to do so, or the keyboard 20 sends a message to the application 30 asking if it should), or e.g. via a flag on the input field that the keyboard 20 can access (similar to field type, e.g. password/number/text/email).

2.

Since, in the present example, the requirement for wholefield correction is coupled with a custom vocabulary of terms, the Application 30 is configured to send a language model or dictionary built from the contacts of the application 30 to the keyboard 20. Alternatively, the keyboard 20 retrieves this language model via an API or the keyboard 20 uses a contact-specific language model it already has access to.

3.

The user types into the input field of the keyboard 20, e.g. "Adam Cu". The Keyboard 20 stores input history throughout input (e.g. touch co-ordinates, gesture co-ordinates, specific keys/characters entered).

4.

The Keyboard 20 sends requests to the prediction engine 21 (which may be part of the keyboard or may be stored elsewhere) for each term/word (e.g. "Adam" and "Cu") which results in a set of candidates (and probabilities) for each term/word (e.g. {"Adam"→0.5, "Alex"→0.2, "Dan"→0.1} and {"Cutmore"→0.9, "Clements"→0.1}).

5.

The keyboard 20 sends the sets of candidates to the application 30 (or the application 30 retrieves them) as a distribution of candidate predictions 25. The application 30 creates a query for searching the contacts using an AND operation between sets and an OR operation within a set (assuming here that the distribution is in the form of an unfactored distribution of candidate predictions). Since the application 30 is interested in the combination of first and last names, the application calculates the combined probabilities resulting in {"Adam Cutmore"→0.45, "Adam Clements"→0.05, "Alex Cutmore"→0.18, "Alex Clements"→0.02, "Dan Cutmore"→0.09, "Dan Clements"→0.01}.

6.

A mechanism 31 of the application 30 filters the predicted contacts/conversations from the list of actual contacts/conversations (e.g. resulting in {"Adam Cutmore"→0.45, "Adam Clements"→0.05, "Dan Clements"→0.01} 35).

7.

The mechanism 31 optionally applies a conversation ranking function to adjust the probabilities of the predicted contacts/conversations based on e.g. recency and recurrence (e.g. resulting in {"Adam Clements"→0.2, "Adam Cutmore"→0.15, "Dan Clements"→0.05}).

8.

The mechanism 31 then re-orders the conversation list using the predicted contacts/conversations (e.g. moving "Adam Clements" to the top, followed by "Adam Cutmore", followed by Dan Clements, followed by the rest of the conversations, ordered by e.g. the conversation ranking function).

As will be understood from the above example implementation, the item predictions 35, 35', 135, 2035 (e.g. predicted contacts or conversations) that are displayed by the application 30, 30', 130, 2030 do not need to match the text of the query string but can, instead, be related to the text of the query string in some way, for example displaying conversations in a conversation app by searching for recipient name, displaying a list of songs when an singer is searched for, displaying a set of images when an artist or painting name is searched for, displaying a poem title when the words of the poem are searched for, etc.

Figure 3:
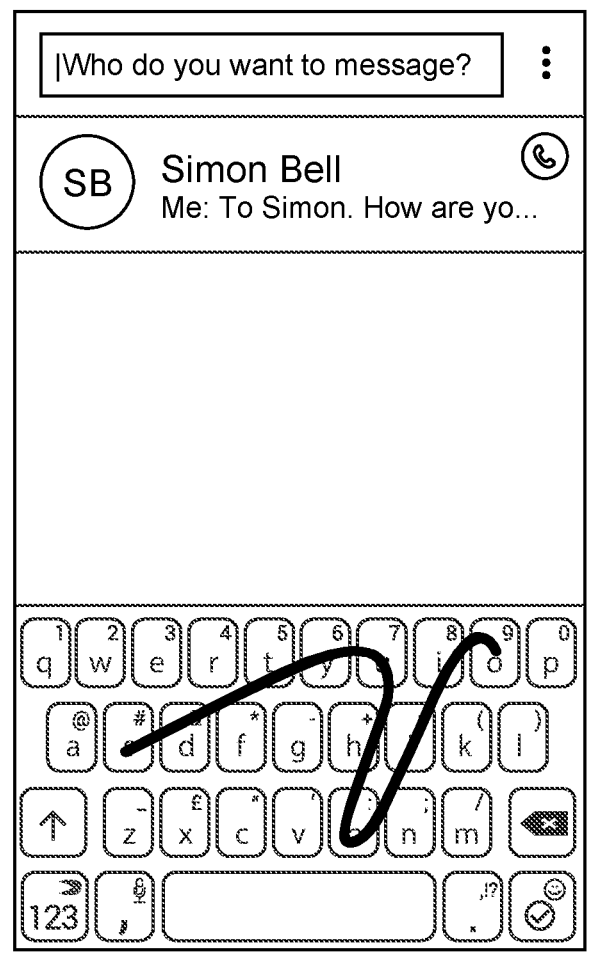
FIG. 3 is a schematic of a user interface displaying a filtered contact/message-thread which has been generated on the basis of a partial gesture across a touchscreen keyboard, in accordance with the present invention.

Owing to the predictive nature of the input modelling component and/or text prediction engine 21, 21', 121, 2021, the search mechanism 31, 31', 131, 2031 can search/filter/order items without requiring input into the text field, for filtering on the basis of text predictions based on a partially completed gesture across a touchsensitive keyboard. Any suitable text prediction engine 21, 21', 121, 2021 for generating text predictions using a prefix or partially entered word via a continuous gesture can be used, an example of which is the system described in detail in international patent application no. PCT/GB2012/052981, filed on 30 Nov. 2012, and published on 25 Jul. 2013, which is hereby incorporated by reference in its entirety. A schematic of a user interface accepting gesture based input and providing filtered results based on the predictions associated with the gesture input is shown in FIG. 3.

The flow of data through this system is very much 'live'—when entering text by tapping, every step will be executed after each tap of user input. When entering text by a continuous user gesture, updates may be made periodically (e.g. every 200 ms). It is therefore important that every component is designed to have low latency (delay between receiving input & emitting output), such that the total latency from input to updated candidate objects is near a target ~100 ms.

As explained above, the prediction candidates (or in the preferred embodiment, the distribution of candidate predictions 25, 25', 125, 2025) are passed from the text prediction engine 21, 21', 121, 2021 to the search mechanism 31, 31', 131, 2031 (e.g. from the keyboard 20 to the application 30), without the user interaction. The user interface is not therefore required to display prediction candidates for a user to select (for example as displayed when a user is composing a message in a messaging application), reducing what is displayed on a user interface. For example, the user interface can display a text entry field and a field for displaying filter/searched/ordered items 35, 35', 135, 2035 (e.g. the contact/message field in FIG. 3), with no text prediction candidate field for user selection, saving valuable space on the user interface and reducing the interaction between the user and the user interface. The Keyboard 20 may be configured to hide the candidate prediction display as soon as the Keyboard 20 and application 30 have entered a special mode, in which the text input is used for filtering/searching/ordering items within the application rather for text input, for example when compiling a message to send to a contact.

The retrieved/filtered items 35, 35', 135, 2035 are presented to a user by the application 30, 30', 130, 2030, which displays one or more of the most-likely items to present to the user for manual selection. Alternatively, the application may be configured to automatically select the top item prediction based on (any of) confidence levels, the amount of user input, and time since presenting the candidate item.

In the detailed embodiments, specific examples of the use of the system have been described, however, the described system can be used in many other applications for filtering/ordering/searching many different types of items. For example, the same principles could be readily applied to keyword search applications (for example web search, document search). Other example uses of the system are retrieval of a web page, finding the application a user wants to launch, retrieval of a song the user wants to play, the matching of a command to send to an in-car control system, a translated phrase the user wants to read/say, or a text prediction task, etc. For any of the example uses of the system, the text prediction engine is configured to generate a distribution of prediction candidates as described above, and the mechanism for sorting/filtering/ordering items is configured to generate a search query as discussed above.

The difference in the use of the system depends on the items searched and the results that are outputted. For an example of phrase translation, the mechanism may be configured to map each word prediction of the distribution of candidate predictions to its equivalent in a foreign language. The mechanism then builds the search query as described above, using the foreign language equivalent word predictions. Since the order of the words within a phrase is likely to change dependent on the language used, the factored distribution of candidate predictions is a suitable choice, since the words do not need to be contextually linked. The search mechanism can search for the translated words in n-gram sequences representing phrases for that foreign language, returning suitable phrases, based on word matching. The results returned to the user are correctly formatted for the foreign language, since they have been generated using the n-gram sequences, which sequences are trained on texts and phrases for that foreign language. The user does not therefore need to specify the correct word order for the foreign language, or even the correct spelling of words in their own language, to generate a correct phrase prediction in the foreign language.

The same n-gram modelling techniques could be applied to spelling and grammar correction of user entered text. For example, the user enters a sentence which is grammatically incorrect, as well as spelt incorrectly. The text prediction engine generates word predictions to correct for the incorrect spelling, and the search engine returns item (i.e. phrase) predictions which correct for the grammatical errors.

Although a system receiving user text input has been described with respect to a user inputting text into a keyboard, it will be understood that the system can receive user text input in other ways, for example by digital dictation and computerized speech recognition, for example for use in intelligent personal assistants (e.g. Apple's Siri, Google Now, Microsoft Cortana). This would be useful for the example of matching a user's spoken command to a programed command in an in-car control system.

Thus, the present invention integrates text prediction capability with mechanisms for filtering/ordering/searching on the basis of the multiple text predictions, and preferably on the basis of multiple whole filed predictions. In addition, the present invention provides a means for integrating a keyboard with prediction (correction and completion) capability with any application on a device, obviating the requirement for duplicating prediction technology within multiple applications or an application provider not having access to such prediction technology.

Figure 4:
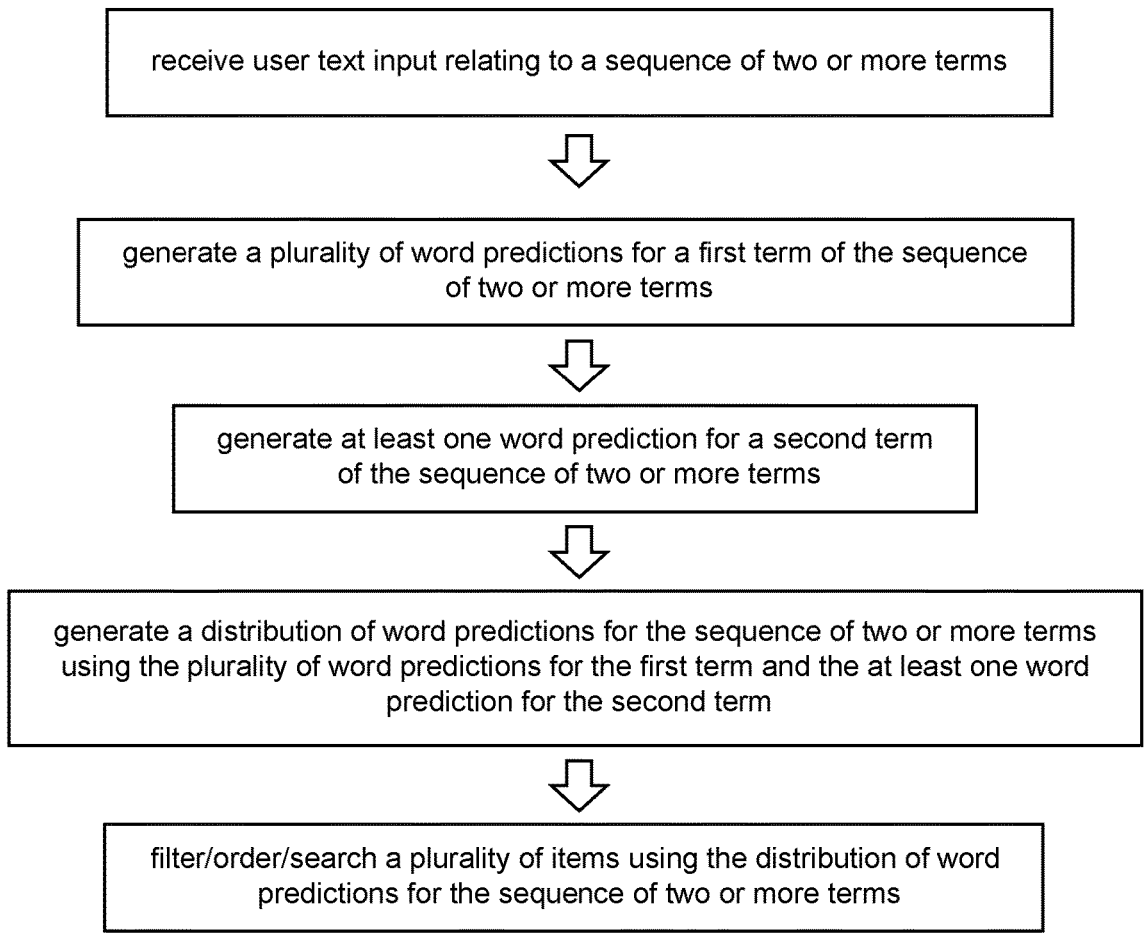
FIG. 4 is a flow chart of a method according to the present invention.

The present invention also provides corresponding methods for integrating text predictions into the search/filter/ordering processing of items. In particular, in one aspect of the invention, there is provided a method according to the flow chart of FIG. 4. The method for searching/ordering/filtering a plurality of items comprises receiving user text input relating to a sequence of two or more terms; generating a plurality of word predictions for a first term of the sequence of two or more terms; generating at least one word prediction for a second term of the sequence of two or more terms; and generating a distribution of word predictions for the sequence of two or more terms using the plurality of word predictions for the first term and the at least one word prediction for the second term. The method further comprises filtering/ordering/searching a plurality of items using the distribution of word predictions for the sequence of two or more terms.

Figure 5:
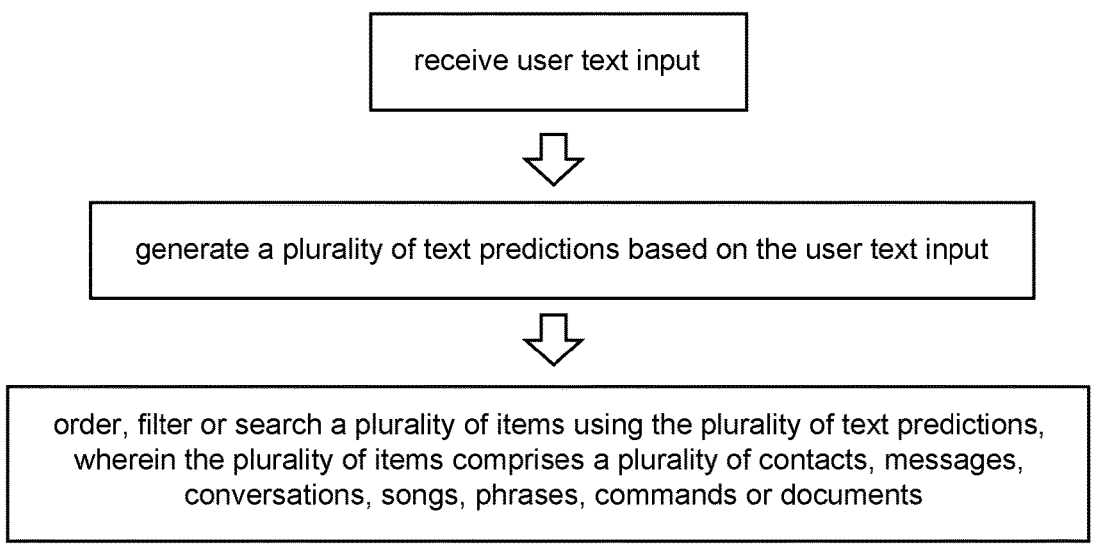
FIG. 5 is a flow chart of a method according to the present invention.

In another aspect of the invention, there is provided a method as shown in FIG. 5. The method for searching/ordering/filtering a plurality of items comprises: receiving user text input; generating a plurality of text predictions based on the user text input; and ordering, filtering or searching a plurality of items using the plurality of text predictions. The plurality of items comprises a plurality of contacts, messages, conversations, songs, phrases, commands or documents.

Other aspects of the methods of the present invention can be readily determined by analogy to the above system description The present invention also provides a computer program for causing a processor to carry out a method according to the present invention.

The computer program may be available for download, for example from a data carrier or from a supplier over the internet or other available network, e.g. downloaded as an app onto a mobile device (such as a mobile phone or tablet) or downloaded onto a computer, the mobile device or computer comprising a processor for executing the computer program once downloaded.

It will be appreciated that this description is by way of example only; alterations and modifications may be made to the described embodiment without departing from the scope of the invention as defined in the claims.

The invention claimed is:

1. A system comprising a processor and memory, the memory storing executable instructions that, when executed by the processor, cause the system to perform operations comprising:

receive, at a keyboard associated with a user interface on a computing device, user text input comprising a plurality of selected characters indicative of a sequence of two or more terms, wherein the user interface is operable to input characters via a touch location or continuous gesture;

generate a plurality of word predictions for a first term of the sequence of two or more terms, the word predictions comprising a first word comprising a subset of the selected characters and a second word generated from a text prediction engine;

generate at least one word prediction for a second term of the sequence of two or more terms, wherein each word prediction for the second term is based on the plurality of word predictions for the first term and the plurality of selected characters;

assign each word prediction an associated probability value determined by the text input and a contextual analysis;

generate a ranked distribution of predicted sequences of two or more terms using probability values of each of the plurality of word predictions for the first term and the probability value of the at least one word prediction for the second term to determine a cumulative probability of each predicted sequence;

filter, search, and order a plurality of items associated with content of an application by at least
  using the ranked distribution of predicted sequences of two or more terms to determine a subset of most likely items;
  generating a relevancy score for each item in the subset based on the ranked distribution and a content vector generated from words associated with each item; and
  ordering items in the subset based on the relevancy score; and output, on a user interface of the computing device, the subset of most likely items to a user.

2. The system of claim 1, further comprising executable instructions that, when executed by the processor, cause the system to perform operations comprising:
  generate a query string from the distribution of word predictions for the sequence of two or more words; and
  filter, search, and order the plurality of items using the query string.

3. The system of claim 1, wherein the subset of most likely items are output for user selection.

4. The system of claim 1, wherein the distribution of word predictions comprises a sequence of the word predictions for each term in the sequence two or more terms.

5. The system of claim 1, further comprising executable instructions that, when executed by the processor, cause the system to perform operations comprising:
  generate a plurality of word predictions for the second term, wherein the distribution of word predictions comprises a sequence comprises the plurality of word predictions for the first term and the plurality of word predictions for the second term.

6. The system of claim 5, further comprising executable instructions that, when executed by the processor, cause the system to perform operations comprising generate a single search query from distribution of candidates.

7. The system of claim 6, further comprising executable instructions that, when executed by the processor, cause the system to perform operations comprising:
  generate a search query by using the "OR" operator between each of the plurality of word predictions for the first term, the "AND" operator between the plurality of word predictions for the first term and the plurality of word predictions for the second term, and the "OR" operator between each of the plurality of word predictions for the second term.

8. The system of claim 1, wherein the first term and the second term are separated by one or more terms or are adjacent terms in the sequence of two or more terms.

9. The system of claim 7, wherein each word prediction comprises a word mapped to a probability value, further comprising executable instructions that, when executed by the processor, cause the system to perform operations comprising:
  output a subset of most-likely items;
    wherein a probability of an item is based on a sequence probability associated with the query which results in that item.

10. The system of claim 1, wherein the distribution of word predictions comprises a plurality of sequences of two or more word predictions, the plurality of sequences of two or more word predictions corresponding to a plurality of sequence predictions.

11. The system of claim 10, wherein each word prediction comprises a word mapped to a probability value, further comprising executable instructions that, when executed by the processor, cause the system to perform operations comprising:
  generate a sequence probability for each of the plurality of sequences of two or more word predictions, by combining the probabilities of the word predictions in each of the sequences.

12. The system of claim 1, further comprising executable instructions that, when executed by the processor, cause the system to perform operations comprising:
  render a keyboard; where the keyboard is configured such that when an executing application is given focus the keyboard enters a special mode in which the text input is used for at least one of filtering, searching, and ordering items within the application rather than for text input.

13. A computing device comprising a processor and memory, the memory storing executable instructions that, when executed by the processor, cause the computing device to perform operations comprising:
  instantiating a user interface comprising:
    a keyboard comprising a character entry display;
    an input text field for displaying inputted text; and
    a predicted items pane for displaying predicted messages contacts, conversations or documents the user may wish to interact with, based on text input by a user;
    wherein the user interface is operable to input characters via a gesture across the user interface, wherein the gesture is a continuous touch gesture and the predicted items pane displays one or more items based on the continuous gesture, even when there is no text committed to the text input field; and
  upon receiving an input gesture relating to a sequence of two or more terms, instantiating a text prediction to perform operations comprising:
    generate a plurality of word predictions for a first term of the sequence of two or more terms the word prediction comprising a first word comprising a subset of the selected characters and a second word generated from a text prediction engine;
    generate at least one word prediction for a second term of the sequence of two or more terms, wherein each word prediction for the second term is based on the plurality of word predictions for the first term and the plurality of selected characters;
    assign each word prediction an associated probability value determined by the text input and a contextual analysis;
    generate a ranked distribution of predicted sequences of two or more terms using probability values of each of the plurality of word predictions for the first term and the at least one word prediction for the second term to determine a cumulative probability of each predicted sequence;

filter, search, and order, by the computing device, a plurality of predicted items associated with content of an application by at least:
  using the ranked distribution of predicted sequences of two or more terms to determine a subset of most likely items;
  generating a relevancy score for each item in the subset based on the ranked distribution and a content vector generated from words associated with each item; and
  ordering items in the subset based on the relevancy score; and
outputting the subset of most likely items on the predicted items pane.

14. A method for searching a plurality of items, the method comprising:
  receiving, at a keyboard associated with a user interface on a computing device comprising a processor and memory, user text input comprising a plurality of selected characters indicative of a sequence of two or more terms, wherein the user interface is operable to input characters via a touch location or continuous gesture;
  generating, by the computing device, a plurality of word predictions for a first term of the sequence of two or more terms the word prediction comprising a first word comprising a subset of the selected characters and a second word generated from a text prediction engine;
  generating at least one word prediction for a second term of the sequence of two or more terms wherein each word prediction for the second term is based on the plurality of word predictions for the first term and the plurality of selected characters;
  assigning each word prediction an associated probability value based on the text input and a contextual analysis;
  generating, by the computing device, a ranked distribution of predicted sequences of two or more terms using probability values of each of the plurality of word predictions for the first term and the at least one word prediction for the second term to determine a cumulative probability of each predicted sequence;
  filtering, ordering, and searching, by the computing device, a plurality of items associated with content of an application by at least:
    using the ranked distribution of predicted sequence of two or more terms to determine a subset of most likely items;
    generating a relevancy score for each item in the subset based on the ranked distribution and a content vector generated from words associated with each item; and
    ordering items in the subset based on the relevancy score; and
  outputting, on a user interface of the computing device, the subset of most likely items to a user.

15. The method of claim 14, further comprising:
  generating a query string from the distribution of word predictions for the sequence of two or more words; and
  filtering, searching, and ordering the plurality of items using the query string.

16. The method of claim 14, wherein the distribution of word predictions comprises a sequence of the word predictions for each term in the sequence two or more terms.

17. The method of claim 14, further comprising:
  generating a plurality of word predictions for the second term, wherein the distribution of word predictions comprises a sequence comprises the plurality of word predictions for the first term and the plurality of word predictions for the second term.

18. The method of claim 17, further comprising generating a single search query from distribution of candidates.

19. The method of claim 18, further comprising:
  generating a search query by using the "OR" operator between each of the plurality of word predictions for the first term, the "AND" operator between the plurality of word predictions for the first term and the plurality of word predictions for the second term, and the "OR" operator between each of the plurality of word predictions for the second term.

20. The method of claim 19, wherein each word prediction comprises a word mapped to a probability value, further comprising:
  outputting a subset of most-likely items for user selection;
  wherein a probability of an item is based on the sequence probability associated with the query which results in that item.

* * * * *